Patented Oct. 21, 1941

2,260,177

UNITED STATES PATENT OFFICE 2,260,177

METHOD FOR MAKING IMPROVED TITANIUM DIOXIDE PIGMENTS

Hermann Giese, Leverkusen-I. G. Werk, Germany, assignor to Titan Company, Inc., Wilmington, Del., a corporation of Delaware No Drawing. Application October 18, 1939, Serial No. 300,004

2 Claims. (Cl. 106—300)

The present invention relates to methods for treating titanium dioxide pigments whereby the same are rendered more resistant to weathering influence, exhibit a materially reduced rate of chalking and little or no tendency to promote the fading of coloring materials with which they may be associated.

The prior art has recognized that the intimate association, for instance, the coating of titanium pigments with alumina favorably influences the chalking, and, in general, the weathering properties of titanium dioxide pigments and the principal object of the present invention is an improved method for accomplishing the intimate association, or coating, as may be, of alumina and titanium dioxide pigment thereby to attain the maximum chalking and general weather resistance and the minimum tendency to fade coloring materials.

The aluminum treatment of titanium pigments has been most conveniently carried out by suspending the particles of a previously prepared titanium dioxide pigment in a solution of an aluminum salt, e. g. aluminum sulfate, then precipitating aluminum hydrates upon the suspended particles of pigment by adding to the suspension an alkaline-reacting reagent, e. g. ammonia. It is to this method of treatment to which the present invention relates.

It has been found, according to the present invention, that there results a material and unexpected enhancement of the weather-resistant, chalk-resistant and fade-resistant properties of titanium dioxide pigments when the aluminum treatment is carried out as follows: The particles of titanium dioxide pigment to be treated are suspended, preferably by agitation in the aluminum salt solution and the suspension agitated for a few hours (one to three hours, preferably about two hours) at a moderately elevated temperature (60° to boiling; preferably about 80° C.) Thereafter, the temperature may or may not be allowed to fall to normal but the pigment particles are allowed to remain in contact with the aluminum salt suspension, while agitating the suspension, for a rather protracted period (five to twenty-five hours, preferably about sixteen hours). After this time, if the temperature has been allowed to fall, the suspension is reheated to the original temperature, the alkaline-reacting reagent is added to precipitate the aluminum hydrates on the pigment particles and the agitation and heating continued for a short time (one to two hours). The so-treated pigment is then separated from the supernatant liquor, washed and dried, after which it is ready for use.

It will thus be seen, from a comparison of the foregoing method of the present invention with those of the prior art, that the essential features of the present invention comprise (a) the heating of the suspension of titanium dioxide pigment in the aluminum salt solution; (b) maintaining the pigment particles in contact with the aluminum salt solution for a definite, predetermined, relatively prolonged retention period; (c) the precipitation of aluminum hydrates on the pigment particles at an elevated temperature, i. e., a temperature above normal and; (d) maintaining the so-treated pigment particles in contact with the mother liquor for a second, but shorter, retention period.

The present invention requires no departure from the type of aluminum salt found usual in practicing the prior art aluminum treatments. Thus, any aluminum salt which with alkaline-reacting reagents will yield aluminum hydrates (by the expression "aluminum hydrates" is meant aluminum hydroxide as well as the hydrated oxides of aluminum), for instance, the sulfate, halides, preferably the chloride, nitrates, acetate, and the like, are suitable for the practice of the present invention.

The concentration of aluminum in the aluminum salt solution is not of primary importance in the practice of the present invention since as will be seen, the amount of aluminum hydrate deposited upon the pigment particles is controlled by the amount of alkaline-reacting reagent added to the aluminum salt-pigment suspension. A convenient concentration, however, will be found between 10 percent and 20 percent aluminum, calculated as $Al_2O_3$.

The amount of aluminum to be deposited as aluminum hydrate upon the pigment particles by the addition of the alkaline-reacting reagent should preferably be not less than about 0.2 percent and not more than about 5.0 percent; a preferred range will lie within about 0.2 percent and about 1.0 percent; all figures being given as $Al_2O_3$ based upon the weight of pigment treated.

Among the alkaline-reacting reagents which may be employed to precipitate aluminum hydrate are, of course, the oxides, hydroxides, carbonates, sulphides, etc. of the alkali metals. The alkaline-reacting compounds of the alkaline-earth metals are not generally to be recommended because, in most instances, they produce insoluble alkaline-earth salts by reaction with the aluminum salt solution, although they may be used, Ammonia is generally to be preferred because the resulting ammonium salt mother liquor is easily removed by washing from the treated titanium dioxide pigment particles.

After the treatment, as above described, the treated pigment particles are removed from the supernatant liquor by any convenient method; for instance, by allowing the pigment particles to settle, then decanting the supernatant liquor. Filtration may also be employed. After removal of the supernatant liquor, the pigment may be dried at temperatures between about 105° C. and 175° C. It is then ready to be used.

The improved results from the present invention may be appreciated by consideration of the following tests:

Titanium dioxide pigment having a pH value= 6.8 was treated with 0.5 per cent $Al_2O_3$ according to the present invention, employing a retention period of the pigment in the aluminum salt of five hours. Two aluminum salts were used, viz., aluminum chloride and aluminum sulfate. The heat-treatment was carried out at five different temperatures, viz., 25° C. (normal), 40° C., 60° C., 80° C., and 100° C. The ten pigments thus obtained were mixed with red pigment material (Lithol-pure-scarlet) and fabricated into distemper surface coatings, and spread upon test panels. The ten panels were then exposed to the light of a quartz-mercury lamp for fifteen hours after which the degree of fading was evaluated. The following table sets forth in a tabular manner the fading observations:

Table

| | Temperature of precipitation | | | | |
|---|---|---|---|---|---|
| | 25° | 40° | 60° | 80° | 100° |
| Al-salt | [1]3 | [1]3 | [2]1 | 1 | 1 |
| Al-chloride | [1]3 | [1]3 | [2]2 | 1 | 1 |
| Al-sulphate | | | | | |

N. B.—The numbers given are arbitrary evaluations of the degree of fading. 2 represents approximately twice the amount of fading as 1; 3 approximately three times.
[1] Poor filtration. (Difficult to remove treated pigment from mother liquor.)
[2] Fair filtration.

Observation as to chalking, and general weather resistance showed corresponding improvement in the pigments treated according to the present invention.

The table just above given shows not only the improved fading properties of pigments treated according to the present invention, but also the improvement in the filtration properties. That is to say, pigments when treated according to the present invention at the elevated temperature are more easily removed by filtration from the mother liquor than pigments treated according to prior art methods.

The following examples illustrate one specific embodiment of the present invention:

*Example No. 1*

1000 kg. $TiO_2$ are suspended by agitation in about 4000 liters of water; a solution of 28 kg. aluminum sulphate (18 percent $Al_2O_3$) is then added to this suspension, and the mixture vigorously stirred for about six hours. The whole is then heated for about 70° C., sufficient ammonia is added to precipitate the aluminum as aluminum hydrate, and the whole stirred continuously at the above temperature for about an hour. The pigment is allowed to settle, separated from the supernatant liquor by filtration and dried at about 100° C.

*Example No. 2*

1000 kg. titanium dioxide pigment are suspended in about 4000 liters of water. To the suspension is added 400 kg. of a solution of aluminum sulphate (sp. gr. 1.100, 2.5% $Al_2O_3$) and the whole is heated to 80° C. The mixture then is maintained under agitation for sixteen hours, reheated to 80° C., aqua ammonia added to raise the pH to about 7.4, and agitation maintained for an additional two hours. The treated pigment is then filtered off and dried at about 150° C. The final product is a titanium dioxide pigment containing one percent alumina, and possessing improved pigment properties.

I claim:

1. Method for improving the properties of titanium dioxide pigments which comprises heating a suspension of titanium dioxide pigment particles in an aluminum salt solution at a temperature between about 25° C. and the boiling point thereof, maintaining the said pigment particles in contact with the aluminum salt solution for a retention period of between about five hours and twenty-five hours, adding to said suspension at a temperature above about 25° C. an alkaline-reacting precipitation agent and thereafter maintaining the so-treated pigment particles in contact with the mother liquor at the said elevated temperature for a second retention period of between about one hour to about two hours.

2. Method for improving the properties of titanium dioxide pigments which comprises heating a suspension of titanium dioxide pigment particles in an aluminum salt solution to about 80° C., maintaining the said pigment particles in contact with the aluminum salt solution for about sixteen hours, adding to the said suspension at about 80° C., an alkaline-reacting precipitation agent and thereafter maintaining the so-treated pigment particles in contact with the mother liquor at the said temperature for about one hour to about two hours.

HERMANN GIESE.